United States Patent
Liou et al.

(10) Patent No.: US 11,466,768 B2
(45) Date of Patent: Oct. 11, 2022

(54) METHODS AND SYSTEMS FOR COOLING TRANSMISSIONS

(71) Applicant: ABB Schweiz Ag, Baden (CH)

(72) Inventors: Joe J. Liou, Windsor, CT (US); Stefan Rakuff, Windsor, CT (US)

(73) Assignee: ABB Schweiz AG, Baden (CH)

( * ) Notice: Subject to any disclaimer, the term of this patent is extended or adjusted under 35 U.S.C. 154(b) by 81 days.

(21) Appl. No.: 16/730,392

(22) Filed: Dec. 30, 2019

(65) Prior Publication Data
US 2020/0208730 A1   Jul. 2, 2020

Related U.S. Application Data

(60) Provisional application No. 62/786,852, filed on Dec. 31, 2018.

(51) Int. Cl.
*F16H 57/04*   (2010.01)
*F16H 57/02*   (2012.01)

(52) U.S. Cl.
CPC ......... *F16H 57/0415* (2013.01); *F16H 57/02* (2013.01); *F16H 57/043* (2013.01); *F16H 57/0417* (2013.01); *F16H 57/0424* (2013.01); *F16H 57/0426* (2013.01); *F16H 57/0457* (2013.01); *F16H 57/0467* (2013.01)

(58) Field of Classification Search
CPC .... F16H 57/0018; F16H 57/02; F16H 57/038; F16H 57/0415; F16H 57/0416; F16H 57/0417; F16H 57/0424; F16H 57/0426; F16H 57/043; F16H 57/045; F16H 57/0457; F16H 57/0467; F16H 2057/02026
See application file for complete search history.

(56) References Cited

U.S. PATENT DOCUMENTS

| | | |
|---|---|---|
| 1,991,618 A | 2/1935 | Lyman |
| 2,583,751 A | 1/1952 | Schmitter |
| 3,476,177 A | 11/1969 | Potzi |

(Continued)

FOREIGN PATENT DOCUMENTS

| | | | |
|---|---|---|---|
| DE | 102004022863 | 12/2005 | |
| DE | 102011087201 A1 * | 5/2013 | ............... F16C 3/02 |

(Continued)

OTHER PUBLICATIONS

Marto, P. J., "An analytical and experimental investigation of rotating, noncapillary heat pipes," 1973, NASA Contractor Report CR-130373, Washington, D. C.. Sep. 1, 1973, 60 pgs.

*Primary Examiner* — Adam D Rogers
(74) *Attorney, Agent, or Firm* — Leydig, Voit & Mayer, Ltd.

(57) ABSTRACT

A transmission includes a housing, a plurality of components, and a cooling system. The housing has a plurality of walls that cooperate to define an interior space and a sump configured to store lubricating fluid in use of the transmission. The plurality of components are arranged in the interior space and configured to cooperatively transmit rotational power between an input shaft and an output shaft of the transmission to reduce a rotational speed of the output shaft relative to a rotational speed of the input shaft in use of the transmission. At least one of the plurality of components is supplied with lubricating fluid stored by the sump in use of the transmission. The cooling system is supported by the housing.

18 Claims, 5 Drawing Sheets

(56) References Cited

U.S. PATENT DOCUMENTS

| | | |
|---|---|---|
| 3,550,678 A | 12/1970 | Pfouts |
| 4,022,272 A | 5/1977 | Miller |
| 4,074,590 A | 2/1978 | Jorg |
| 4,414,861 A | 11/1983 | Witt |
| 5,193,415 A | 3/1993 | Massel |
| 5,579,830 A | 12/1996 | Giammaruti |
| 5,816,320 A | 10/1998 | Arnold et al. |
| 6,210,042 B1 | 4/2001 | Wang et al. |
| 6,415,855 B2 | 7/2002 | Gerard et al. |
| 6,425,293 B1 | 7/2002 | Woodroffe et al. |
| 6,691,831 B1 | 2/2004 | Furuya |
| 6,761,546 B2 | 7/2004 | Schlipf et al. |
| 6,919,504 B2 | 7/2005 | McCutcheon et al. |
| 7,231,767 B2 | 6/2007 | Whiting |
| 7,443,062 B2 | 10/2008 | Dong et al. |
| 7,569,955 B2 | 8/2009 | Hassett et al. |
| 7,687,945 B2 | 3/2010 | Martin |
| 7,975,804 B2 * | 7/2011 | Kuryu .................. F16H 57/043 184/6.12 |
| 8,410,350 B2 | 4/2013 | Corrales et al. |
| 8,556,585 B2 * | 10/2013 | Abe .................. F16H 57/0416 416/185 |
| 8,833,193 B2 | 9/2014 | Straub et al. |
| 8,967,334 B2 | 3/2015 | Straub et al. |
| 8,973,458 B2 | 3/2015 | Straub et al. |
| 9,062,754 B2 | 6/2015 | Straub et al. |
| 9,272,777 B2 * | 3/2016 | McGlaun ................ B64C 27/12 |
| 9,366,332 B2 * | 6/2016 | Hayashi ............. F16H 57/0416 |
| 9,599,406 B2 | 3/2017 | Tietyen et al. |
| 9,756,759 B2 * | 9/2017 | Kimura .............. H05K 7/20145 |
| 9,856,759 B2 | 1/2018 | Schiedig et al. |
| 9,951,859 B2 | 4/2018 | Becka |
| 10,058,008 B2 | 8/2018 | Yang |
| 10,151,380 B2 * | 12/2018 | Uesugi ................ F16H 57/0424 |
| 10,221,935 B2 * | 3/2019 | Kimura ................ F04D 19/002 |
| 10,247,296 B2 * | 4/2019 | van der Merwe ...... F16H 57/02 |
| 10,260,817 B2 | 4/2019 | Fetzer et al. |
| 10,330,174 B2 * | 6/2019 | Nies ........................ B23P 15/14 |
| 10,458,534 B1 | 10/2019 | Liou et al. |
| 10,753,455 B2 * | 8/2020 | van der Merwe ...... F16H 57/02 |
| 10,876,800 B2 * | 12/2020 | Cole .................... F16H 57/0416 |
| 2005/0151554 A1 | 7/2005 | Rae et al. |
| 2006/0231337 A1 * | 10/2006 | Vogeltanz ................ F16N 7/36 184/6 |
| 2015/0289850 A1 | 10/2015 | Lewis et al. |
| 2018/0299210 A1 | 10/2018 | Ronacher |
| 2019/0368502 A1 | 12/2019 | Rakuff et al. |
| 2019/0368595 A1 | 12/2019 | Liou et al. |
| 2019/0368596 A1 | 12/2019 | Rakuff et al. |
| 2021/0199190 A1 * | 7/2021 | Li ........................ F16H 57/038 |

FOREIGN PATENT DOCUMENTS

| | | | |
|---|---|---|---|
| DE | 102015222892 A1 * | 5/2017 | ............. F16H 57/04 |
| DE | 102019001493 A1 * | 9/2020 | ......... B23K 20/1205 |
| EP | 0623767 | 11/1994 | |
| EP | 0990820 A2 * | 4/2000 | ............... H02K 9/19 |
| JP | 3757765 | 3/2006 | |
| WO | 9104427 | 4/1991 | |

* cited by examiner

METHODS AND SYSTEMS FOR COOLING TRANSMISSIONS

CROSS-REFERENCE TO RELATED APPLICATION

The present application claims the benefit of the filing date of U.S. Provisional Application Ser. No. 62/786,852 filed on Dec. 31, 2018, which is incorporated herein by reference.

TECHNICAL FIELD

The present invention generally relates to transmissions, and more particularly, but not exclusively, to transmission housings and shafts.

BACKGROUND

Prolonging the service life of transmissions and associated components remains an area of interest. Some existing devices, systems, and/or methods have various shortcomings in certain applications. Accordingly, there remains a need for further contributions in this area of technology.

SUMMARY

One embodiment of the present invention is a unique transmission including a cooling system. Other embodiments include apparatuses, systems, devices, hardware, methods, and combinations for cooling transmission components. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
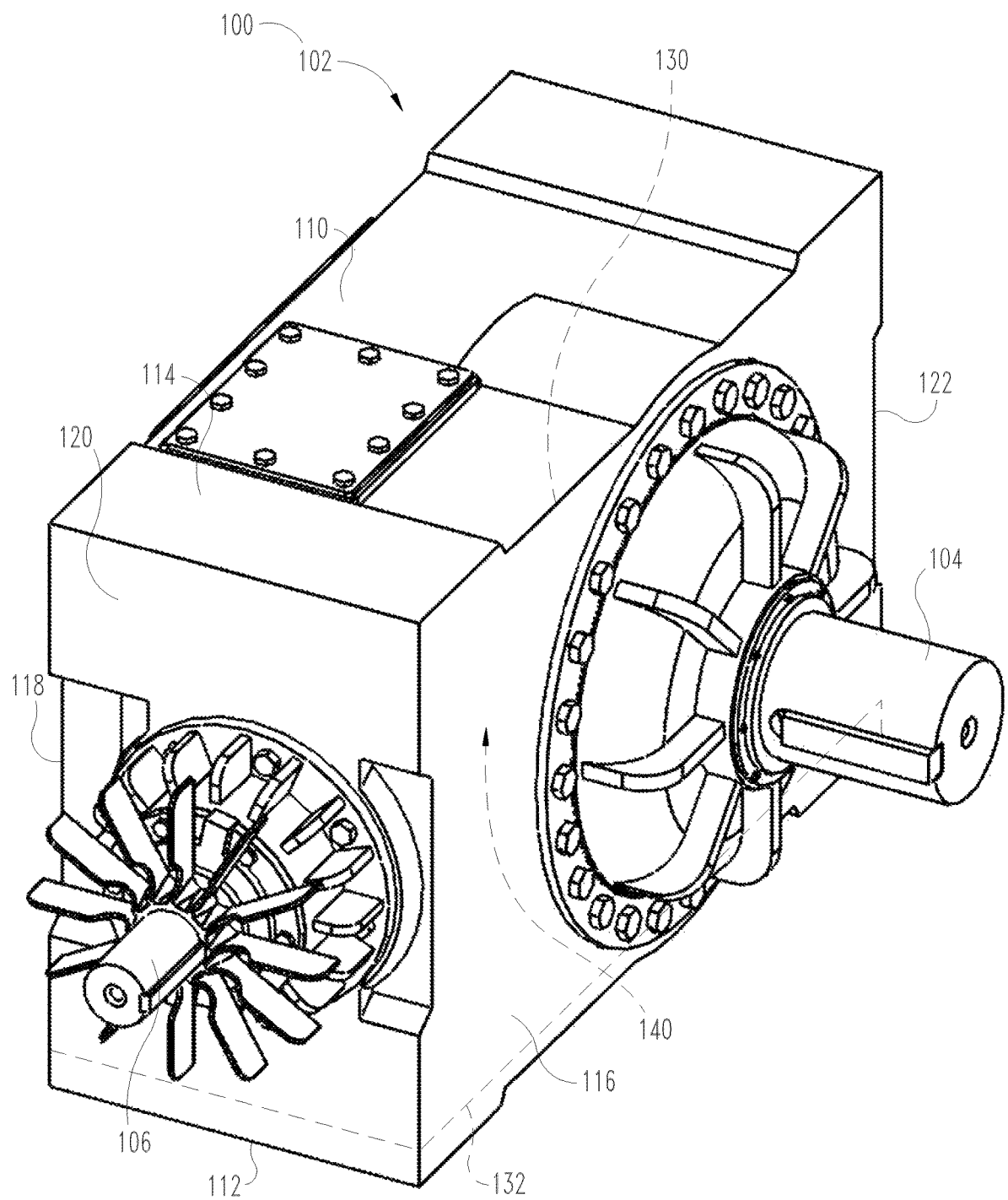
FIG. 1 is a perspective view of a transmission.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. While illustrative embodiments of the invention are described below, in the interest of clarity, not all features of an actual implementation of the invention may be described herein.

Referring now to FIG. 1, an illustrative transmission 100 is embodied as, or otherwise includes, a gear reducer 102. As described below, in the illustrative embodiment, the gear reducer 102 incorporates, or is otherwise adapted for use with, a cooling system 200 (see FIG. 2). The cooling system 200 and methods therefor exemplify one embodiment of the present disclosure. It should be appreciated that in the interest of simplicity and/or clarity, one or more features of the illustrative gear reducer 102 may be depicted schematically in FIG. 1. Moreover, it should be appreciated that certain features of the illustrative gear reducer 102, such as one or more shafts, gears, bearings, covers, fans, fasteners, oil, etc., for example, may not be depicted in FIG. 1.

The illustrative gear reducer 102 includes a housing 110 having walls 112, 114, 116, 118, 120, 122 that cooperate to define an interior space 130. Additionally, the walls 112-122 cooperate to define a sump 132 configured to store lubricating fluid (e.g., oil) in use of the gear reducer 102. Components 140 are arranged in the interior space 130 and configured to cooperatively transmit rotational power between an input shaft 104 and an output shaft 106 of the gear reducer 102 to reduce a rotational speed of the output shaft 106 relative to a rotational speed of the input shaft 104 in use of the gear reducer 102. In use of the gear reducer 102, at least one of the components 140 is supplied with lubricating fluid stored by the sump 132. It should be appreciated, of course, that the components 140 may include, or otherwise be embodied, structures that cooperate to transmit rotational power between the input shaft 104 and the output shaft 106, such as shafts, sleeves, bearings, gears, pinions, idlers, clutches, brakes, guides, brackets, rods, or the like, for example.

Figure 2:
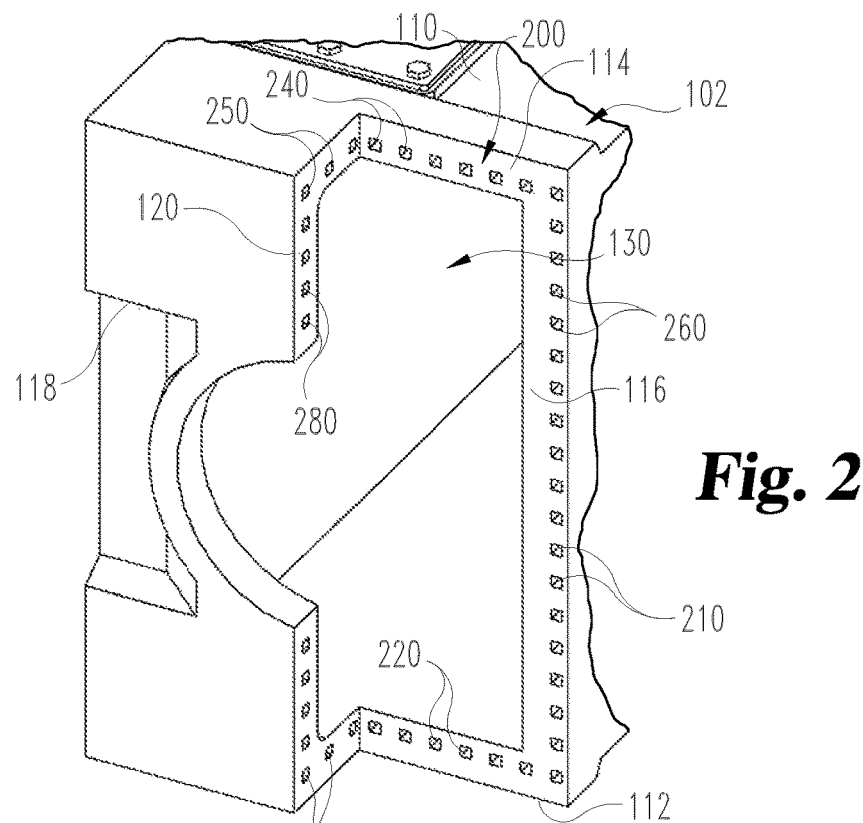
FIG. 2 is a partial cut-away perspective view of the transmission of FIG. 1.
Figure 3:
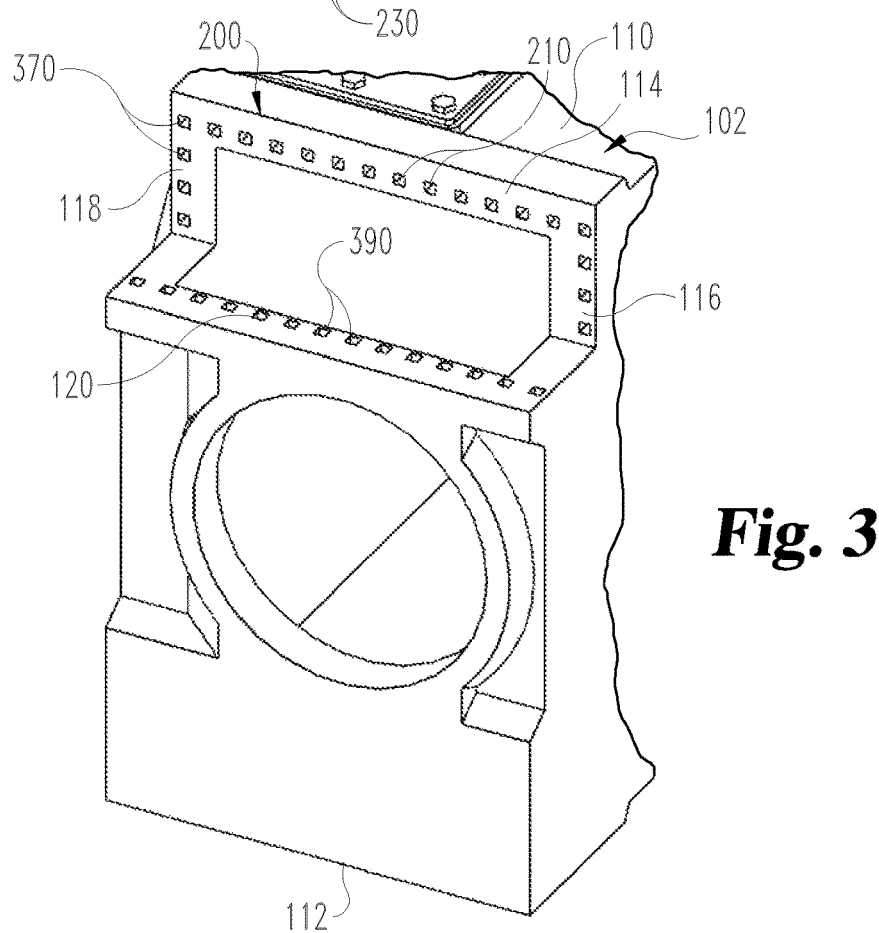
FIG. 3 is another partial cut-away perspective view of the transmission of FIG. 1.

Referring now to FIGS. 2 and 3, for the purposes of simplicity and/or clarity, a number of features are omitted from the illustrative gear reducer 102 (e.g., the shafts 104, 106 and the components 140). The housing 110 of the gear reducer 102 is cutaway to show the cooling system 200 in each of FIGS. 2 and 3. In the illustrative embodiment, the cooling system 200 is supported by, and substantially enclosed within, the housing 110. The cooling system 200 includes heat pipes 210 that are arranged in the walls 112-122 and configured to dissipate heat generated by the components 140 during operation thereof to cool the lubricating fluid stored by the sump 132 in use of the gear reducer 102.

The wall 112 of the housing 110 is illustratively embodied as, or otherwise includes, a bottom wall 112 arranged to contact a support surface (not shown). The heat pipes 210 illustratively include a set of heat pipes 220 and a set of heat pipes 230 that are arranged in the bottom wall 112. As depicted in FIG. 2, the set of heat pipes 230 are arranged in the bottom wall 112 perpendicular, or at least generally perpendicular, to the set of heat pipes 220.

The wall 114 of the housing 110 is illustratively embodied as, or otherwise includes, a top wall 114 arranged opposite the bottom wall 112. The heat pipes 210 illustratively include a set of heat pipes 240 and a set of heat pipes 250 that are arranged in the top wall 114. As depicted in FIG. 2, the set of heat pipes 250 are arranged in the top wall 114 perpendicular, or at least generally perpendicular, to the set of heat pipes 240.

The wall 116 of the housing 110 is illustratively embodied as, or otherwise includes, a front wall 116 that may be arranged in confronting relation with a housing of a rotational power source or other drive unit. The front wall 116 is arranged perpendicular to, and interconnected with, the bottom and top walls 112, 114. As depicted in FIG. 2, the heat pipes 210 illustratively include a set of heat pipes 260 arranged in the front wall 116.

The wall 118 of the housing 110 is illustratively embodied as, or otherwise includes, a back wall 118 that is arranged opposite the front wall 116. The back wall 118 is arranged perpendicular to, and interconnected with, the bottom and top walls 112, 114. As depicted in FIG. 3, the heat pipes 210 illustratively include a set of heat pipes 370 arranged in the back wall 118.

The wall 120 of the housing 110 is illustratively embodied as, or otherwise includes, a side wall 120. The side wall 120 is arranged perpendicular to, and interconnected with, the bottom and top walls 112, 114 and the front and back walls 116, 118. The heat pipes 210 illustratively include a set of heat pipes 280 and a set of heat pipes 390 arranged in the side wall 120. As depicted in FIGS. 2 and 3, the set of heat pipes 390 are arranged in the side wall 120 perpendicular, or at least generally perpendicular, to the set of heat pipes 280.

The wall 122 of the housing 110 is illustratively embodied as, or otherwise includes, a side wall 122 arranged opposite the side wall 120. The side wall 122 is arranged perpendicular to, and interconnected with, the bottom and top walls 112, 114 and the front and back walls 116, 118. Although not shown in FIGS. 2 and 3, it should be appreciated that the illustrative heat pipes 210 may include one or more sets of heat pipes arranged in the side wall 122. For example, two sets of heat pipes may be arranged in the side wall 122 in similar fashion to the arrangement of the sets of heat pipes 280, 390 in the side wall 120.

In the illustrative embodiment, the heat pipes 210 cooperatively form a criss-crossed and/or lattice-type arrangement in the housing 110. In some embodiments, a criss-crossed and/or lattice-type arrangement may be cooperatively formed by one or more of the following: (i) the sets of heat pipes 220, 230; (ii) the sets of heat pipes 240, 250; (iii) the sets of heat pipes 280, 390; and (iv) the set(s) of heat pipes arranged in the side wall 122. Furthermore, in some embodiments, the heat pipes 210 may be interconnected with, and/or fluidly coupled to, one another.

In the illustrative embodiment, each of the heat pipes 210 has a square cross-sectional shape. Of course, it should be appreciated that in other embodiments, each of the heat pipes 210 may have another suitable cross-sectional shape. In one example, each of the heat pipes 210 may have a circular cross-sectional shape. In another example, each of the heat pipes 210 may have a semi-circular, triangular, or trapezoidal cross-sectional shape.

In the illustrative embodiment, the housing 110 is constructed from metallic materials and fabricated by a casting process. Of course, it should be appreciated that in other embodiments, the housing 110 may have another suitable construction, such as a construction from polymeric, plaster, or concrete materials, for example. Additionally, in other embodiments, it should be appreciated that the housing 110 may be fabricated by another suitable manufacturing process.

FIG. 2 is an isometric cutaway view of the housing 110 while many other components are removed for better illustration. FIG. 3 is another isometric cutaway view of the housing 110. A group of heat pipes 210 are distributed within the walls 112-122. The heat pipes 210 may be either embedded during casting of the housing 110 or fabricated through a machining process after the casting process.

The cross sections of the heat pipes 210 are not limited to the square shapes shown in FIG. 2 and FIG. 3. The cross sections may be fabricated into different shapes such as circle, semi-circle, triangle and trapezoid for different purposes. For example, the circular or semi-circular cross sections may be superior in strength while the square cross sections may provide a maximum surface area to the heat source.

Welding process or other methods of sealing may be required to seal ends of the heat pipes 210 so that there is only one inlet and one outlet. After the heat pipes 210 are evacuated, a suitable amount of working fluid may then be filled into the heat pipes 210 through the inlet while evacuating the heat pipes 210 at the outlet. Thereafter, the inlet and outlet may be sealed. The working fluid may be selected to meet the temperature requirement for reducing the oil sump 132 temperature without corroding the heat pipe 210 material. Once the working fluid is dwelled within the heat pipes 210, the inlet and outlet holes may be welded for permanent sealing of the heat pipe system.

The enclosed gear reducer 102 may form a group of interconnected surrounding heat pipes 210 within the housing 110. A final machining process may be required to remove any excess from the sealing or welding operations from the outer surfaces of the housing 110.

Figure 4:
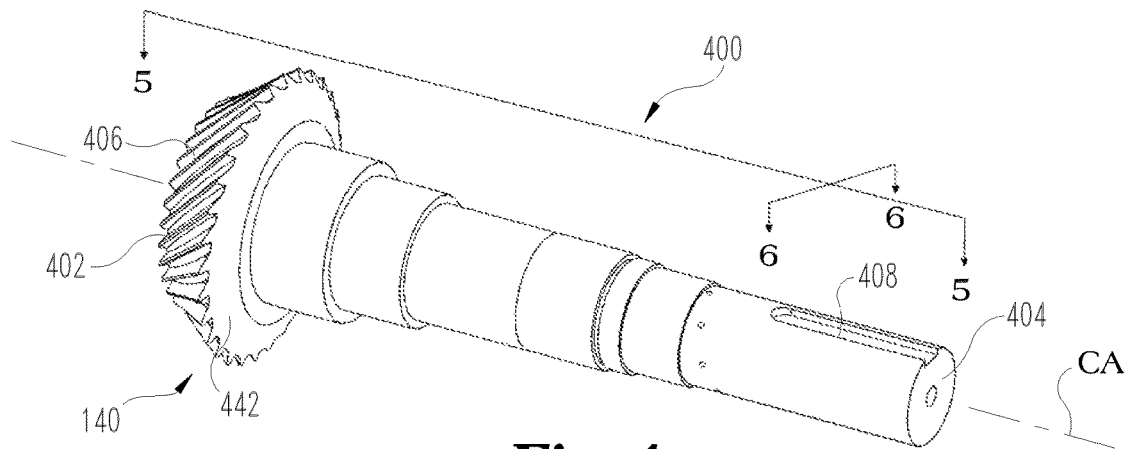
FIG. 4 is a perspective view of a shaft for use with a transmission.

Referring now to FIG. 4, an illustrative input shaft 400 is configured to receive rotational power from a rotational power source. The input shaft 400 is included in, or otherwise adapted for use with, the gear reducer 102 such that the input shaft 400 is embodied as an input shaft of the gear reducer 102. As such, the input shaft 400 may be included in the gear reducer 102 in lieu of the input shaft 104, in which case the input shaft 400 may be coupled to, and extend outside of, the front wall 116 of the housing 110, for example.

In the illustrative embodiment, at least one of the components 140 is formed integrally with the input shaft 400 and supplied with lubricating fluid stored by the sump 132 in use of the gear reducer 102. More specifically, a gear 442 is formed integrally with the input shaft 400 and supplied with lubricating fluid stored by the sump 132 in use of the gear reducer 102. The input shaft 400 may therefore be referred to as a geared shaft 400 embodied as a one-piece, monolithic component. In any case, the gear 442 is a component configured for lubrication by a dip or splash lubrication technique. As such, the illustrative gear 442 is at least partially immersed in lubricating fluid stored by the sump 132.

The illustrative shaft 400 includes an end 402 and an end 404 arranged opposite the end 402. The end 402 is defined by the gear 442 and the end 404 may be coupled to a rotational power source (e.g., an electric motor). In the illustrative embodiment, the shaft 400 (i.e., excluding the gear 442) is a generally cylindrical part that extends about a central axis CA between the end 402 and the end 404. As described below with reference to FIGS. 5 and 6, a cooling system 500 is arranged in, and supported by, the input shaft 400. The cooling system 500 and methods therefor exemplify another embodiment of the present disclosure. As discussed below, the cooling system 500 includes heat pipes 510 extending through the input shaft 400 that are configured to dissipate heat generated by the components 140 during operation thereof to cool the lubricating fluid stored by the sump 132 in use of the gear reducer 102.

Referring to FIG. 4, a typical geared shaft 400 may be a monolithic component. The geared shaft 400 may have one gear-end 402 immersed in the oil sump 132 within the enclosed gear reducer 102 and the other end 404 extended out of the reducer housing 110 to connect to an electric motor. The geared shaft 400 may be generally in cylindrical shape with various sections of different diameters, except for the gear-end 402 where gear teeth 406 may be fabricated and the other end 404 where a keyway 408 may be located. The geared shaft 400 may be constructed such that a plurality of heat pipes 510 extending within the geared shaft 400 between the gear-end 402 and the other end 404 effectively transfer the heat generated in the oil sump 132 to the ambient.

This group of heat pipes 510 may be fabricated through the machining process since the geared shaft 400 may typically be made from the machining process. The cross sections of the heat pipes 510 may be fabricated to different shapes that depend on the function of the heat pipes 510. One particular feature of the geared shaft 400 is that there are a number of heat pipes 510 extending near the end 404 of the shaft 402 that connects to an electric motor.

Figure 5:
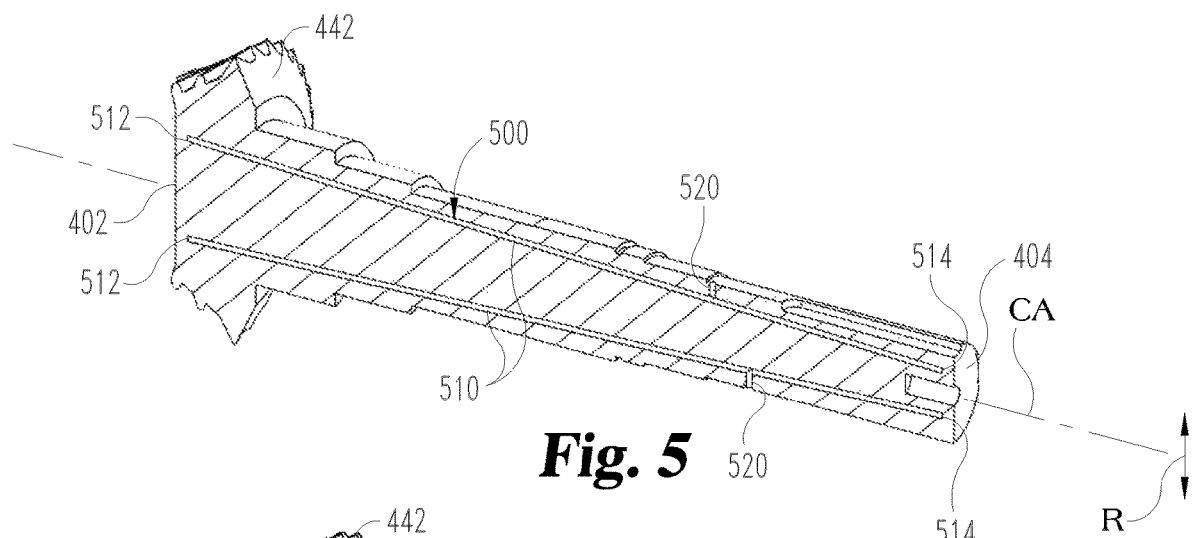
FIG. 5 is a sectional view of the shaft of FIG. 4.

Referring now to FIG. 5, in which a sectional view of the input shaft 400 taken about the line 5-5 is depicted, the heat pipes 510 each include an end 512 and an end 514 arranged opposite the end 512. The end 512 is located adjacent the end 402 of the input shaft 400, whereas the end 514 is located adjacent the end 404 of the input shaft 400. The end 512 of each of the heat pipes 510 is arranged radially outward (i.e., outward in a radial direction indicated by arrow R) of the end 514 of each of the heat pipes 510 relative to the central axis CA. Therefore, each of the heat pipes 510 extends through the input shaft 400 at an angle to the central axis CA. Put another way, each of the heat pipes 510 are inclined with respect to the central axis CA such that the ends 512 are farther away from the central axis CA (i.e., in the radial direction R) than the ends 514.

In the illustrative embodiment, in addition to the heat pipes 510, the cooling system 500 includes feed ports 520 each fluidly coupled, or otherwise in fluid communication with, one of the heat pipes 510 to supply a working fluid thereto in use of the gear reducer 102. The feed ports 520 are located closer to the end 404 of the input shaft 400 than the end 402 thereof. Each of the feed ports 520 extends through the input shaft 400 toward the central axis CA in the radial direction R to open into one of the heat pipes 510.

FIG. 5 is a sectional view of the geared shaft 400 of FIG. 4. The geared shaft 400 may have heat pipes 510 oriented such that the heat pipes 510 (e.g., central axes of the heat pipes 510) are inclined with respect to the central axis CA of the shaft 400. As a result, ends 512 of the heat pipes 510 adjacent to the gear-end 402 may be farther from the central shaft axis CA than the ends 514. In operation of the enclosed gear reducer 102, the heat pipes 510 may spin around the geared shaft axis CA. In addition to the heat pipes 510, there may be a plurality of passages 520 branching in the radial direction R within the geared shaft 400 near the other end 404. These passages 520 may be constructed in a spiral pattern to provide channels for the vapor transporting to a supplementary heat exchanger, such as the supplementary heat exchanger 900 (see FIG. 9), for example.

Figure 6:
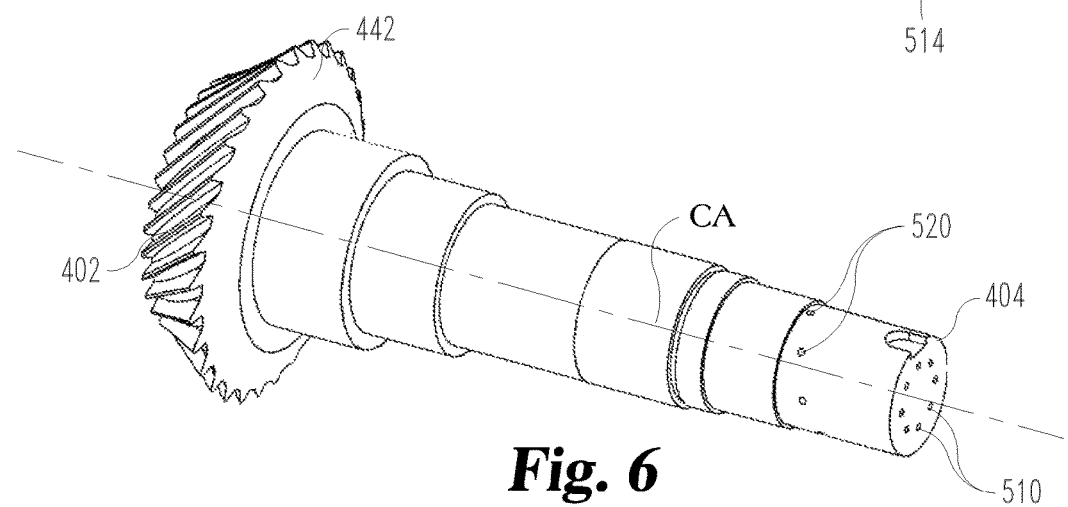
FIG. 6 is another sectional view of the shaft of FIG. 4.

Referring now to FIG. 6, in which a sectional view of the input shaft 400 taken about line 6-6 is depicted, the heat pipes 510 are illustratively circumferentially spaced from one another around the central axis CA. More specifically, the heat pipes 510 are circumferentially spaced from one another around the central axis CA in a symmetric fashion such that the heat pipes 510 are equidistant, or at least substantially equidistant, from the central axis CA. In the illustrative embodiment, the heat pipes 510 include eight heat pipes. Consequently, the feed ports 520 illustratively include eight feed ports. Of course, it should be appreciated that in other embodiments, the heat pipes 510 may include another suitable number of heat pipes and the feed ports 520 may include another suitable number of feed ports.

FIG. 6 is a section view of the geared shaft 400 of FIG. 4 along line 6-6. The geared shaft 400 may be generally cylindrical with various diameters and may define the central shaft axis CA. The heat pipes 510 in the geared shaft 400 may be aligned symmetrically around the central shaft axis CA to maintain balance momentum during rotation. The number of heat pipes 510 may depend on the heat input and available space within the geared shaft 400 and may not limited to the eight heat pipes 510 shown in FIG. 6.

Figure 7:
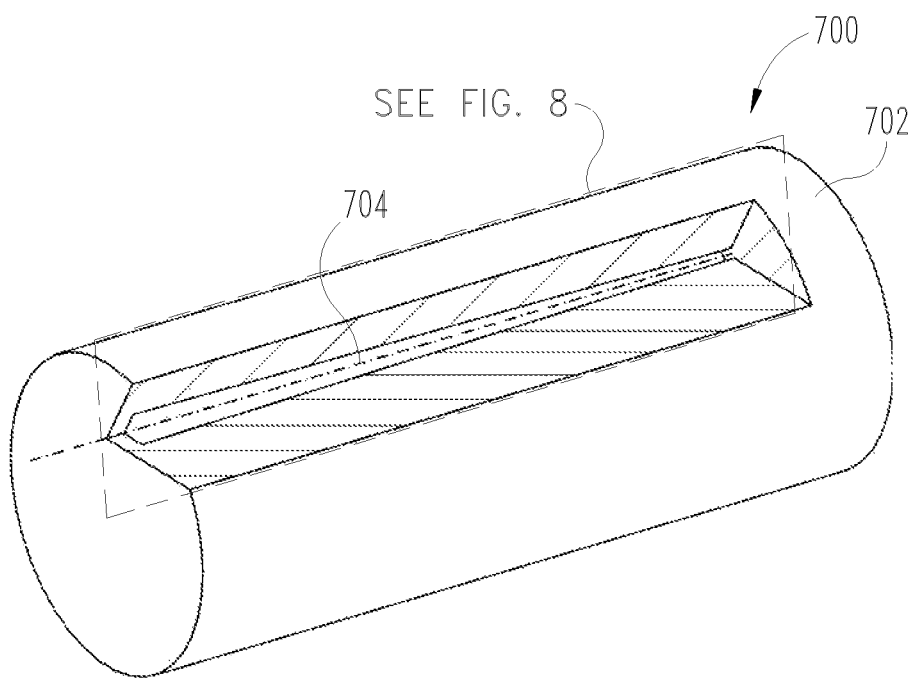
FIG. 7 is a schematic, cut-away view of a heat pipe for use with a transmission.
Figure 8:
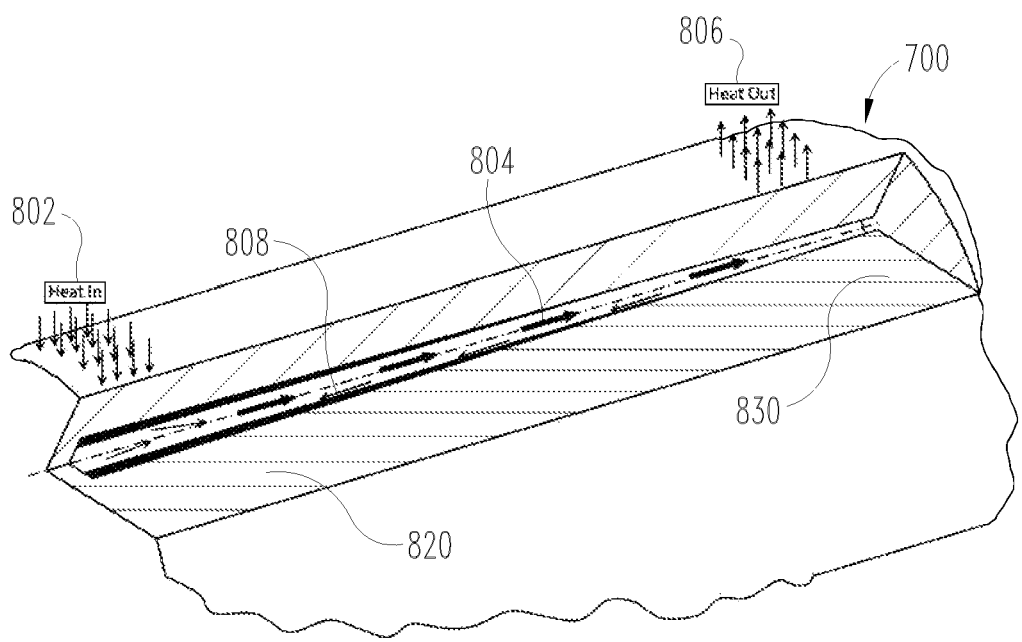
FIG. 8 is a detail view of the heat pipe of FIG. 7.

Referring now to FIGS. 7 and 8, an illustrative heat pipe 700 is adapted for use with the gear reducer 102 such that the heat pipe 700 may be included in at least one of the cooling systems 200, 500. As such, in some embodiments, each of the heat pipes 210 may be embodied as, or otherwise include, the heat pipe 700. Similarly, in some embodiments, each of the heat pipes 510 may be embodied as, or otherwise include, the heat pipe 700.

The illustrative heat pipe 700 is a closed tube 702 which may be fabricated within a component (e.g., within the housing 110 or the input shaft 400) through a machining process. In embodiments in which each of the heat pipes 210 is embodied as, or otherwise includes, the heat pipe 700, the heat pipe 700 may be stationary. In embodiments in which each of the heat pipes 510 is embodied as, or otherwise includes, the heat pipe 700, the heat pipe 700 may be configured for rotation (e.g., about the central axis CA). In embodiments in which each of the heat pipes 510 is embodied as, or otherwise includes, the heat pipe 700, the heat pipe 700 may have an internal wall 704 that is tapered such that the heat pipe 700 has a non-constant cross-sectional area. That is, one region of the heat pipe 700 (e.g., a region in relatively close proximity to an evaporator section 820) may have a cross-sectional area different from another region of the heat pipe 700 (e.g., a region in relatively close proximity to a condenser section 830).

It should be appreciated that the construction of the illustrative heat pipe 700 depends on the working fluid contained therein. In the illustrative embodiment, the heat pipe 700 has a metallic construction. In one example, the heat pipe 700 may be formed from copper materials and the working fluid may be water. In another example, the heat pipe 700 may be formed from aluminum materials and the working fluid may be ammonia. In yet another example, the heat pipe 700 may be formed from copper, aluminum, stainless steel, cesium, potassium, sodium, or refractory materials, and the working fluid may be helium, mercury, sodium, indium, alcohol, ethanol, refrigerant, R134a, nitrogen, oxygen, neon, hydrogen, or lithium.

Operation of the illustrative heat pipe 700 is depicted in FIG. 8. Prior to operation, a suitable amount of working fluid is supplied to the heat pipe 700. In use, heat 802 produced by one or more components (e.g., the components 140) is applied to an evaporator section 820 of the heat pipe 700. As heat 802 is applied to the evaporator section 820, the working fluid evaporates, thereby forming a vapor. A pressure differential is created inside the heat pipe 700 such that vapor located at or near the evaporator section 820 has a higher pressure than vapor located at or near a condenser section 830 of the heat pipe 700 arranged opposite the evaporator section 820. As a consequence of the pressure differential, vapor flows in the vapor direction 804 from the evaporator section 820 toward the condenser section 830. At the condenser section 830, heat 806 is removed such that the vapor returns to a liquid state. The liquid working fluid may thereafter flow in the liquid direction 808 from the condenser section 830 toward the evaporator section 820.

In embodiments in which each of the heat pipes 510 is embodied as, or otherwise includes, the heat pipe 700, centrifugal forces associated with rotation of the input shaft 400, in cooperation with the taper of the internal wall 704, may propel liquid working fluid from the condenser section 830 to the evaporator section 820 along the wall 704. In such embodiments, because centrifugal forces at least partially propel the working fluid, inclusion of a wick in the heat pipe 700 that is made from materials different from the heat pipe 700 may be unnecessary.

Figure 9:
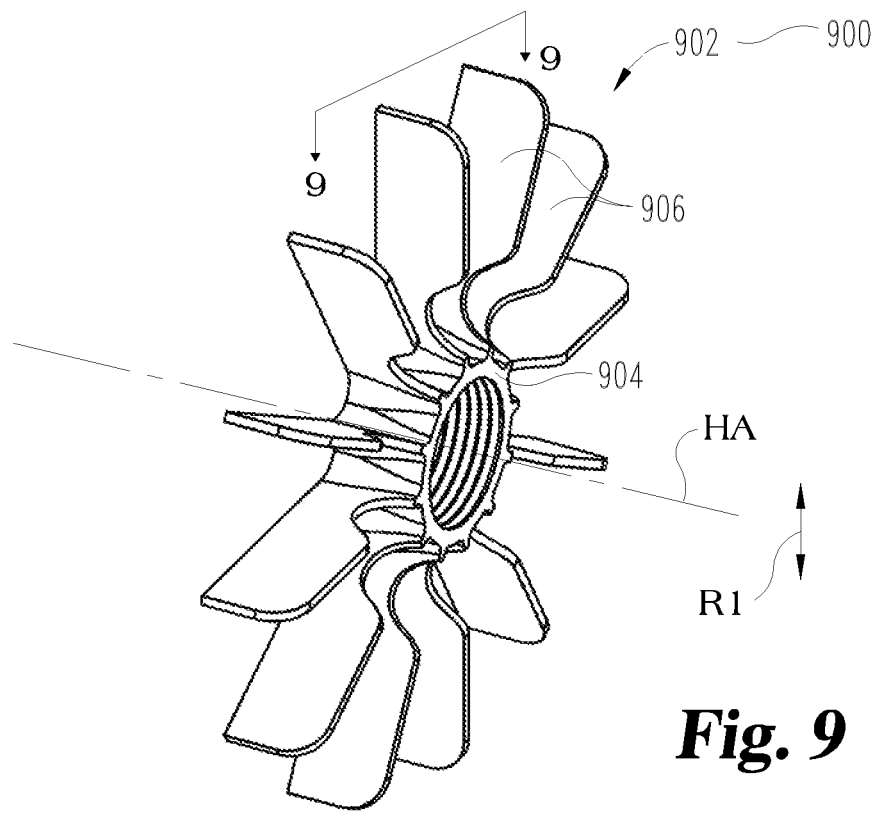
FIG. 9 is a perspective view of a fan for use with a transmission.

Referring now to FIG. 9, a fan 900 includes, or is otherwise embodied as, a heat exchanger 902 adapted for use with the input shaft 400 described above with reference to FIGS. 4-6. As such, it should be appreciated that the heat exchanger 902 may be included in, or otherwise adapted for use with, at least one of the cooling systems 200, 500. In the illustrative embodiment, the heat exchanger 902 is intended to supplement the cooling system 500 to further dissipate heat generated by components (e.g., the components 140) during operation thereof to cool lubricating fluid (e.g., the lubricating fluid stored by the sump 132). Thus, in the illustrative embodiment, the heat exchanger 902 cooperates with the cooling system 500 to dissipate heat in use of the gear reducer 102.

In the illustrative embodiment, the heat exchanger 902 includes a central hub 904 and blades 906 coupled to the central hub 904. The central hub 904 extends around a hub axis HA. The blades 906 extend outwardly from the central hub 904 in a radial direction indicated by arrow R1. The central hub 904 is configured for rotation about the hub axis HA in use of the gear reducer 102 such that the heat exchanger 902 (i.e., the blades 906) moves air toward the housing 110 to facilitate dissipation of heat generated by components (e.g., the components 140) during operation thereof.

Figure 10:
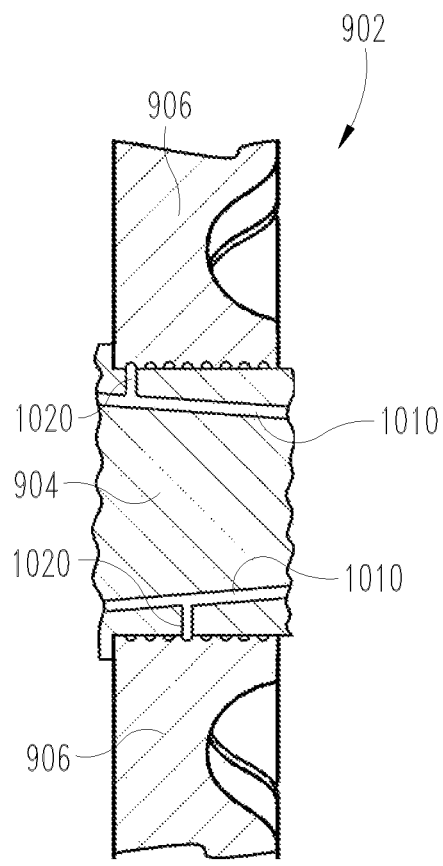
FIG. 10 is a sectional view of the fan of FIG. 9.

Referring now to FIG. 10, a sectional view of the heat exchanger 902 taken about line 9-9 is shown. In the illustrative embodiment, the heat exchanger 902 includes heat pipes 1010 extending through the central hub 904. In some embodiments, the heat pipes 1010 may be in fluid communication with the heat pipes 510 of the cooling system 500 such that heat removed by the heat pipes 510 may be applied to the heat pipes 1010 to enhance heat transfer from the sump 132 to the ambient through the heat pipes 510, 1010. In any case, the heat exchanger 902 includes feed passages 1020 each fluidly coupled to one of the heat pipes 1010 to supply a working fluid thereto in use of the gear reducer 102. Each of the feed passages 1020 extends through the central hub 904 in the radial direction R1 to open into one of the heat pipes 1010.

Referring to FIGS. 9 and 10, a fan-blade heat exchanger 902 is illustrated that may be used as a supplementary heat exchanger with the present enclosed gear reducer 102. The supplementary heat exchanger 902 may be designed to accelerate the heat transfer from a fluid (a liquid or a gas) to a second fluid (another liquid or gas) without the two fluids having to mix together or come into direct contact by adding more surface areas between the two fluids.

The fan-blade heat exchanger 902 may include one or more heat pipes 1010, a cylindrical hub 904, and a plurality of fan blades 906. It should be appreciated that the heat pipes 1010 in the fan-blade heat exchanger 902 may have multiple configurations. One possible configuration may be comprised of heat pipes 1010 having semi-circular cross-sectional shapes as shown in FIG. 10. This may be accomplished by using a cylindrical surface on the geared shaft 400 and machined grooves on a bore surface of the cylindrical hub 904. Another possible configuration may consist of heat pipes 1010 with circular cross sections by grooving with semi-circular cross sections on a cylindrical surface of the geared shaft 400 and on a bore surface of the cylindrical hub 904.

Sealing of the heat pipes 1010 may be achieved through a tight fit between the geared shaft 400 and the hub 904. Welding may be used to seal the heat pipes 1010. The fan blades 906 may protrude from the cylindrical hub 904 radially outward. The fan blades 906 may be constructed in a paddle shape without inclination and twist so that the fan-blade heat exchanger 902 can provide the same cooling effectiveness when rotating both in clockwise and counter-clockwise directions.

The purpose of the fan-blade heat exchanger 902 may be two-fold. One purpose may be to provide as much surface area as possible to accelerate the heat transfer at the condenser section 830 of each heat pipe 510. The other purpose may be to create air flow around the enclosed gear reducer 102, thereby enhancing the cooling effectiveness on the enclosed gear reducer 102.

The present invention relates generally to a method and system for cooling an industrial gear reducer and, more particularly, to a gear reducer with a totally enclosed housing. The present invention may improve the thermal power rating, performance, and service life of gear reducers. The invention may be applicable to industries such as mining, aggregate, grain, power plants, wood products, and metals. Applications may include conveyors, bucket elevators, crushers/breakers, feeders, mills, and kilns.

Enclosed gear reducers are mechanical devices generally used to multiply the torque generated by an input rotary power source, mainly from electric motors, to increase the amount of usable work and reduce the input rotary power source speed to achieve desired output speeds. Enclosed gear reducers may consist of various rotating components including gears, bearings, and shafts. These rotating components typically generate heat and require oil lubrication during operation.

Two different oil lubrication methods may be used in enclosed gear reducers: dip lubrication and jet lubrication. For dip lubrication, also referred as to splash lubrication, the rotating components may be immersed in an oil sump, and the motion of the components may supply the circulation necessary to lubricate gear meshes and bearings. For jet lubrication, an extension of a circulating oil system including dedicated scavenge pump, pipes, nozzles, and oil reservoir may be required to provided pressurized oil jets into the gear meshes and bearings. Dip lubrication may be preferred for enclosed gear reducers in the aggregate, cement, air handling, oil and gas, mining, elevator, crane, and food processing industries because of its lower cost and simplicity. As a result, maintaining an acceptable oil temperature in the oil sump may prolong the service life of an enclosed gear reducer.

The gears in an enclosed gear reducer incorporating dip lubrication techniques may be partially immersed in the oil when the reducer is mounted in a horizontal position with the electric motor. In some applications, the gears may be fully immersed in the oil when the reducer is mounted in a vertical position with the electric motor. Gears fully immersed in the oil may in turn generate considerable "churning losses" (i.e., transmission horsepower which is consumed and therefore lost mainly in the form of heat) in turning the countershaft and merely overcoming the resistance exerted by the oil to the rotation of the gears.

The generated heat due to the churning losses may be so excessive that the oil sump is overheated and thereby exceeds the maximum allowable oil sump temperature (commonly 200 F), even when the enclosed gear reducer is not externally loaded. An overheated oil sump may cause the enclosed gear reducer to deteriorate, fail, and/or create a safety risk. Therefore, an enclosed gear reducer may need an effective cooling system to ensure satisfactory service life and eliminate damages resulted from overheating.

There are several methods that may be used to cool the oil sump and therefore extend the service life of an enclosed gear reducer. The methods may be grouped in two categories: air cooling and water cooling. Air cooling may include the following design elements: natural cooling, shaft driven fans, oil-to-air heat exchangers, and external electric fans. Natural cooling may utilize natural convection and radiation to transfer heat from the oil sump to ambient. Some features such as cooling fins may be added on the housing to enhance heat transfer. However, that method may be insufficient for higher loads encountered in many applications.

Cooling with shaft driven fans may use a fan mounted on the shaft of an enclosed gear reducer to provide forced air flow around the sump. The cooling effectiveness of shaft driven fans may depend on the shaft speed, fan diameter, number of fan blades, and fan blade shape (twist angle, pitch-to-chord ratio, blade width, etc.). In many cases, the effectiveness may be limited by the size of the enclosed gear reducer, the shaft speed, and the direction of rotation. For example, some enclosed gear reducers may be operated both in the clockwise and counterclockwise directions which limits the design flexibility of the fan blades.

Cooling with oil-to-air heat exchangers may involve pumps to circulate the sump oil through air-cooled heat exchangers, in which the fins may be added and electric fans may be used to cool the hot oil. The cooled oil may be fed back through a return pipe to the oil sump for reuse. These heat exchangers may require additional floor space and external piping for oil flow. Electric fans may be alternatives to the shaft driven fans in which electricity is provided to power the fans and control the rotational speeds.

Water cooling may include oil-to-water heat exchangers and cooling tubes. For cooling with oil-to-water heat exchangers, the sump oil may be pumped to a heat exchanger where water may be used to cool the oil. It may require 25 gallon per minute of water flow for the oil-to-water heat exchanger. For cooling with tubes, cool water may enter one end of a plurality of tubes running through the oil sump such that heat is carried to another end of the tubes (like an inverted fin). Fins may be added on the cooling tubes to enhance the heat transfer. Pumps may also be required to achieve a higher flow rate within the cooling tubes.

The rotational motion of gears and bearings in an enclosed gear reducer may cause oil foam that is a collection of small bubbles of air accumulated on or near the surface of the oil. Oil foam may be an efficient thermal insulator. The presence of air bubbles in the oil may cause overheating in the pump used for oil-to-air and oil-to-water heat exchangers, and reduce heat transfer effectiveness in the heat exchangers.

At many mining sites, e.g., overland conveying systems, enclosed gear reducers may have to be very reliable in dirty, dusty, and harsh environments with minimal attention and confined small spaces, especially without a water supply. Therefore, an improved method and system for efficiently removing heat from the oil sump of an enclosed gear reducer may be required.

According to one aspect of the present disclosure, a transmission may include a housing, a plurality of components, and a cooling system. The housing may include a plurality of walls that cooperate to define an interior space and a sump configured to store lubricating fluid in use of the transmission. The plurality of components may be arranged in the interior space, and the plurality of components may be configured to cooperatively transmit rotational power between an input shaft and an output shaft of the transmission to reduce a rotational speed of the output shaft relative to a rotational speed of the input shaft in use of the transmission. At least one of the plurality of components may be supplied with lubricating fluid stored by the sump in use of the transmission. The cooling system may be supported by the housing, and the cooling system may include plurality of heat pipes arranged in the plurality of walls of the housing that are configured to dissipate heat generated by the plurality of components during operation thereof to cool the lubricating fluid stored by the sump in use of the transmission.

In some embodiments, the plurality of walls may include a bottom wall arranged to contact a support surface, and the plurality of heat pipes may include a first set of heat pipes arranged in the bottom wall and a second set of heat pipes arranged in the bottom wall perpendicular to the first set of heat pipes.

In some embodiments, the plurality of walls may include a top wall arranged opposite the bottom wall, and the plurality of heat pipes may include a first set of heat pipes arranged in the top wall and a second set of heat pipes arranged in the top wall perpendicular to the first set of heat pipes.

In some embodiments, the plurality of walls may include a front wall arranged perpendicular to the bottom wall, and the plurality of heat pipes may include a first set of heat pipes arranged in the front wall.

In some embodiments, the plurality of walls may include a back wall arranged opposite the front wall, and the plurality of heat pipes may include a first set of heat pipes arranged in the back wall.

In some embodiments, the plurality of walls may include a side wall arranged perpendicular to the top and back walls, and the plurality of heat pipes may include a first set of heat pipes arranged in the side wall and a second set of heat pipes arranged in the side wall perpendicular to the first set of heat pipes.

In some embodiments, the plurality of heat pipes may cooperatively form a criss-crossed arrangement.

In some embodiments, each of the plurality of heat pipes may have a square cross-sectional shape.

According to another aspect of the present disclosure, a transmission may include a housing, an input shaft, a plurality of components, and a cooling system. The housing may define a sump configured to store lubricating fluid in use of the transmission. The input shaft may extend outside of the housing, and the input shaft may be configured to receive rotational power from a rotational power source. The plurality of components may be arranged in the housing, and the plurality of components may be configured to cooperatively transmit rotational power between the input shaft and an output shaft of the transmission to reduce a rotational speed of the output shaft relative to a rotational speed of the input shaft in use of the transmission. At least one of the plurality of components may be integrally formed with the input shaft and supplied with lubricating fluid stored by the sump in use of the transmission. The cooling system may be supported by the input shaft, and the cooling system may include a plurality of heat pipes extending through the input shaft that are configured to dissipate heat generated by the plurality of components during operation thereof to cool the lubricating fluid stored by the sump in use of the transmission.

In some embodiments, the at least one of the plurality of components may define a first end of the input shaft that is arranged opposite a second end of the input shaft coupled to the rotational power source, the input shaft may extend about a central axis between the first end and the second end, and each of the plurality of heat pipes may extend through the input shaft at an angle to the central axis.

In some embodiments, each of the plurality of heat pipes may include a first end located adjacent the first end of the input shaft and a second end opposite the first end that is located adjacent the second end of the input shaft, and the first end of each of the plurality of heat pipes may be arranged radially outward of the second end of each of the plurality of heat pipes relative to the central axis.

In some embodiments, the plurality of heat pipes may be circumferentially spaced around the central axis in a symmetric fashion.

In some embodiments, the cooling system may include a plurality of feed ports each fluidly coupled to one of the plurality of heat pipes to supply a working fluid thereto in use of the transmission, and the plurality of feed ports may be located closer to the second end of the input shaft than the first end of the input shaft.

In some embodiments, each of the plurality of feed ports may extend through the input shaft toward the central axis in a radial direction to open into one of the plurality of heat pipes.

In some embodiments, the plurality of heat pipes may include eight heat pipes.

In some embodiments, the at least one of the plurality of components may be a gear that is at least partially immersed in lubricating fluid stored by the sump.

According to yet another aspect of the present disclosure, a transmission may include a housing, an input shaft, a plurality of components, a cooling system, and a heat exchanger. The housing may define a sump configured to store lubricating fluid in use of the transmission. The input shaft may extend outside of the housing, and the input shaft may be configured to receive rotational power from a rotational power source. The plurality of components may be arranged in the housing, and the plurality of components may be configured to cooperatively transmit rotational power between the input shaft and an output shaft of the transmission to reduce a rotational speed of the output shaft relative to a rotational speed of the input shaft in use of the transmission. At least one of the plurality of components may be coupled to the input shaft and supplied with lubricating fluid stored by the sump in use of the transmission. The cooling system may be supported by the input shaft, and the cooling system may include a plurality of heat pipes extending through the input shaft that are configured to dissipate heat generated by the plurality of components during operation thereof to cool the lubricating fluid stored by the sump in use of the transmission. The heat exchanger may be configured to dissipate heat generated by the plurality of components during operation thereof to cool the lubricating fluid stored by the sump in cooperation with the cooling system in use of the transmission.

In some embodiments, the heat exchanger may include a central hub, a plurality of blades extending outwardly from the central hub, and a plurality of heat pipes extending through the central hub.

In some embodiments, the heat exchanger may include a plurality of feed passages each fluidly coupled to one of the plurality of heat pipes of the heat exchanger to supply a working fluid thereto in use of the transmission, and each of the plurality of feed passages may extend through the central hub in a radial direction to open into one of the plurality of heat pipes of the heat exchanger.

In some embodiments, the central hub may be configured for rotation about a hub axis in use of the transmission such that the heat exchanger moves air toward the housing to facilitate dissipation of heat generated by the plurality of components during operation thereof.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A transmission comprising:
    a housing that defines a sump configured to store lubricating fluid in use of the transmission;
    an input shaft extending outside of the housing that is configured to receive rotational power from a rotational power source;
    a plurality of components arranged in the housing that are configured to cooperatively transmit rotational power between the input shaft and an output shaft of the transmission to reduce a rotational speed of the output shaft relative to a rotational speed of the input shaft in use of the transmission, at least one of the plurality of components being integrally formed with the input shaft and supplied with the lubricating fluid stored by the sump in use of the transmission; and
    a cooling system supported by the input shaft, the cooling system including a plurality of heat pipes extending through the input shaft that are configured to dissipate heat generated by the plurality of components during operation thereof,
    wherein each heat pipe comprises a closed tube that contains a working fluid.

2. The transmission of claim 1, wherein the plurality of heat pipes cools the lubricating fluid stored by the sump in use of the transmission.

3. The transmission of claim 2, wherein the plurality of heat pipes include eight heat pipes.

4. The transmission of claim 2, wherein the at least one of the plurality of components is a gear that is at least partially immersed in the lubricating fluid stored by the sump.

5. The transmission of claim 2, wherein:
the at least one of the plurality of components defines a first end of the input shaft that is arranged opposite a second end of the input shaft coupled to the rotational power source;
the input shaft extends about a central axis between the first end and the second end; and
each of the plurality of heat pipes extends through the input shaft at an angle to the central axis.

6. The transmission of claim 5, wherein the cooling system includes a plurality of feed ports each fluidly coupled to one of the plurality of heat pipes to supply the working fluid thereto in use of the transmission, and wherein the plurality of feed ports are located closer to the second end of the input shaft than the first end of the input shaft.

7. The transmission of claim 6, wherein each of the plurality of feed ports extends through the input shaft toward the central axis in a radial direction to open into one of the plurality of heat pipes.

8. The transmission of claim 5, wherein each of the plurality of heat pipes includes a first end located adjacent the first end of the input shaft and a second end opposite the first end that is located adjacent the second end of the input shaft, and wherein the first end of each of the plurality of heat pipes is arranged radially outward of the second end of each of the plurality of heat pipes relative to the central axis.

9. The transmission of claim 8, wherein the plurality of heat pipes are circumferentially spaced around the central axis in a symmetric fashion.

10. The transmission of claim 1, wherein:
the housing further includes a plurality of walls that cooperate to define an interior space; and
the cooling system further supported by the housing, the cooling system further including a plurality of heat pipes arranged in the plurality of walls of the housing that are configured to dissipate heat generated by the plurality of components during operation thereof to cool the lubricating fluid stored by the sump in use of the transmission.

11. The transmission of claim 10, wherein the plurality of walls include a bottom wall arranged to contact a support surface and the plurality of heat pipes include a first set of heat pipes arranged in the bottom wall and a second set of heat pipes arranged in the bottom wall perpendicular to the first set of heat pipes.

12. The transmission of claim 11, wherein the plurality of walls include a top wall arranged opposite the bottom wall and the plurality of heat pipes include a first set of heat pipes arranged in the top wall and a second set of heat pipes arranged in the top wall perpendicular to the first set of heat pipes.

13. The transmission of claim 12, wherein the plurality of walls include a front wall arranged perpendicular to the bottom wall and the plurality of heat pipes include a first set of heat pipes arranged in the front wall.

14. The transmission of claim 1, wherein each heat pipe further comprises an internal wall that is tapered such that each heat pipe comprises a non-constant cross-sectional area.

15. The transmission of claim 1, wherein each heat pipe is formed from at list one member of a group consisting of copper, aluminum, stainless steel, cesium, potassium, and sodium and the working fluid comprises at least one member of a group consisting of helium, mercury, sodium, indium, alcohol, ethanol, refrigerant, R134a, nitrogen, oxygen, neon, hydrogen, and lithium.

16. A transmission comprising:
a housing that defines a sump configured to store lubricating fluid in use of the transmission;
an input shaft extending outside of the housing that is configured to receive rotational power from a rotational power source;
a plurality of components arranged in the housing that are configured to cooperatively transmit rotational power between the input shaft and an output shaft of the transmission to reduce a rotational speed of the output shaft relative to a rotational speed of the input shaft in use of the transmission, at least one of the plurality of components being coupled to the input shaft and supplied with the lubricating fluid stored by the sump in use of the transmission;
a cooling system supported by the input shaft, the cooling system including a plurality of heat pipes extending through the input shaft that are configured to dissipate heat generated by the plurality of components during operation thereof to cool the lubricating fluid stored by the sump in use of the transmission; and
a heat exchanger configured to dissipate heat generated by the plurality of components during operation thereof to cool the lubricating fluid stored by the sump in cooperation with the cooling system in use of the transmission,
wherein the heat exchanger includes a central hub, a plurality of blades extending outwardly from the central hub, and a plurality of heat pipes extending through the central hub.

17. The transmission of claim 16, wherein the heat exchanger includes a plurality of feed passages each fluidly coupled to one of the plurality of heat pipes of the heat exchanger to supply a working fluid thereto in use of the transmission, and wherein each of the plurality of feed passages extends through the central hub in a radial direction to open into one of the plurality of heat pipes of the heat exchanger.

18. The transmission of claim 17, wherein the central hub is configured for rotation about a hub axis in use of the transmission such that the heat exchanger moves air toward the housing to facilitate dissipation of heat generated by the plurality of components during operation thereof.

* * * * *